(12) United States Patent
Frame

(10) Patent No.: US 11,383,747 B2
(45) Date of Patent: Jul. 12, 2022

(54) CART

(71) Applicant: Ballymore Company, Inc., Coatesville, PA (US)

(72) Inventor: William F. Frame, Coatesville, PA (US)

(73) Assignee: Ballymore Company, Inc., Coatesville, PA (US)

( * ) Notice: Subject to any disclaimer, the term of this patent is extended or adjusted under 35 U.S.C. 154(b) by 0 days.

(21) Appl. No.: 17/027,024

(22) Filed: Sep. 21, 2020

(65) Prior Publication Data
US 2021/0086816 A1    Mar. 25, 2021

Related U.S. Application Data

(60) Provisional application No. 62/902,717, filed on Sep. 19, 2019.

(51) Int. Cl.
*B62B 5/06*    (2006.01)
*B62B 3/10*    (2006.01)

(52) U.S. Cl.
CPC ............. *B62B 5/061* (2013.01); *B62B 3/102* (2013.01)

(58) Field of Classification Search
CPC ............ B62B 5/061; B62B 3/102; B62B 5/06
USPC ............................................ 280/47.34, 79.3
See application file for complete search history.

(56) References Cited

U.S. PATENT DOCUMENTS

| | | | | |
|---|---|---|---|---|
| 2,712,452 A * | 7/1955 | Bennett | ............... | B60D 1/143 280/79.11 |
| 3,104,890 A * | 9/1963 | Hill | ............... | B62B 3/02 280/659 |
| 5,244,221 A * | 9/1993 | Ward | ............... | B62B 1/002 269/17 |
| 5,476,282 A * | 12/1995 | Dahl | ............... | B62B 1/002 280/47.18 |
| 5,556,118 A * | 9/1996 | Kern | ............... | B62B 3/008 280/47.16 |
| 6,036,219 A * | 3/2000 | Oefelein | ............... | B62B 3/02 280/35 |
| 6,206,385 B1 * | 3/2001 | Kern | ............... | B62B 3/02 280/47.35 |
| 6,260,863 B1 * | 7/2001 | Orozco | ............... | B60B 33/00 280/33.997 |
| 6,270,094 B1 * | 8/2001 | Campbell | ............... | B62B 3/006 242/594.4 |
| 6,394,470 B1 * | 5/2002 | Shirai | ............... | B62B 3/184 280/33.996 |
| 6,793,223 B2 * | 9/2004 | Ondrasik | ............... | B60B 33/0002 280/33.997 |
| 6,860,493 B2 * | 3/2005 | Orozco | ............... | B60B 33/0002 280/33.991 |
| 6,966,574 B1 * | 11/2005 | Dahl | ............... | B62B 1/002 280/47.18 |

(Continued)

FOREIGN PATENT DOCUMENTS

WO    WO-2006046946 A2 *   5/2006    ............. A62C 33/02

*Primary Examiner* — James A Shriver, II
*Assistant Examiner* — Hilary L Johns

(57) ABSTRACT

A cart includes a planar platform for holding bulk goods. The platform includes first and second oppositely disposed ends and first and second oppositely disposed sides, a top surface and an underside. One or more casters or wheels attached to the platform to facilitate mobility; and
a plurality of upstanding rails extend from the platform at one or both ends of the cart.

3 Claims, 6 Drawing Sheets

(56) References Cited

U.S. PATENT DOCUMENTS

| | | | |
|---|---|---|---|
| 9,283,975 B2* | 3/2016 | McClanahan | B62B 3/1476 |
| 10,351,155 B1* | 7/2019 | Thuma | B62B 3/004 |
| 2003/0205875 A1* | 11/2003 | Ondrasik | B62B 3/1476 280/47.34 |
| 2014/0015210 A1* | 1/2014 | Pasek | B62B 3/108 280/79.7 |
| 2015/0344052 A1* | 12/2015 | McClanahan | B62B 3/02 280/35 |

* cited by examiner

CART

CROSS-REFERENCE TO RELATED APPLICATIONS

This application claims priority to U.S. Provisional Patent Application Ser. No. 62/902,717, filed Sep. 19, 2019.

STATEMENT REGARDING FEDERALLY SPONSORED RESEARCH OR DEVELOPMENT

The present invention was not developed with the use of any Federal Funds, but was developed independently by the inventors.

BACKGROUND

1. Field

The present invention relates to a cart, and more specifically to a combined lumber cart and flatbed cart.

2. Background

Typically, a warehouse type retail store stocks two kinds of carts for carrying bulk goods: both a lumber cart and also flatbed cart. The present invention combines the functions of both into one cart eliminating one cart from the fleet and realizing efficiencies therefrom.

SUMMARY

In one embodiment of the present invention, the

BRIEF DESCRIPTION OF THE DRAWINGS

The embodiments will be described in detail with reference to the following drawings in which like reference numerals refer to like elements wherein.

DETAILED DESCRIPTION

Figure 1:
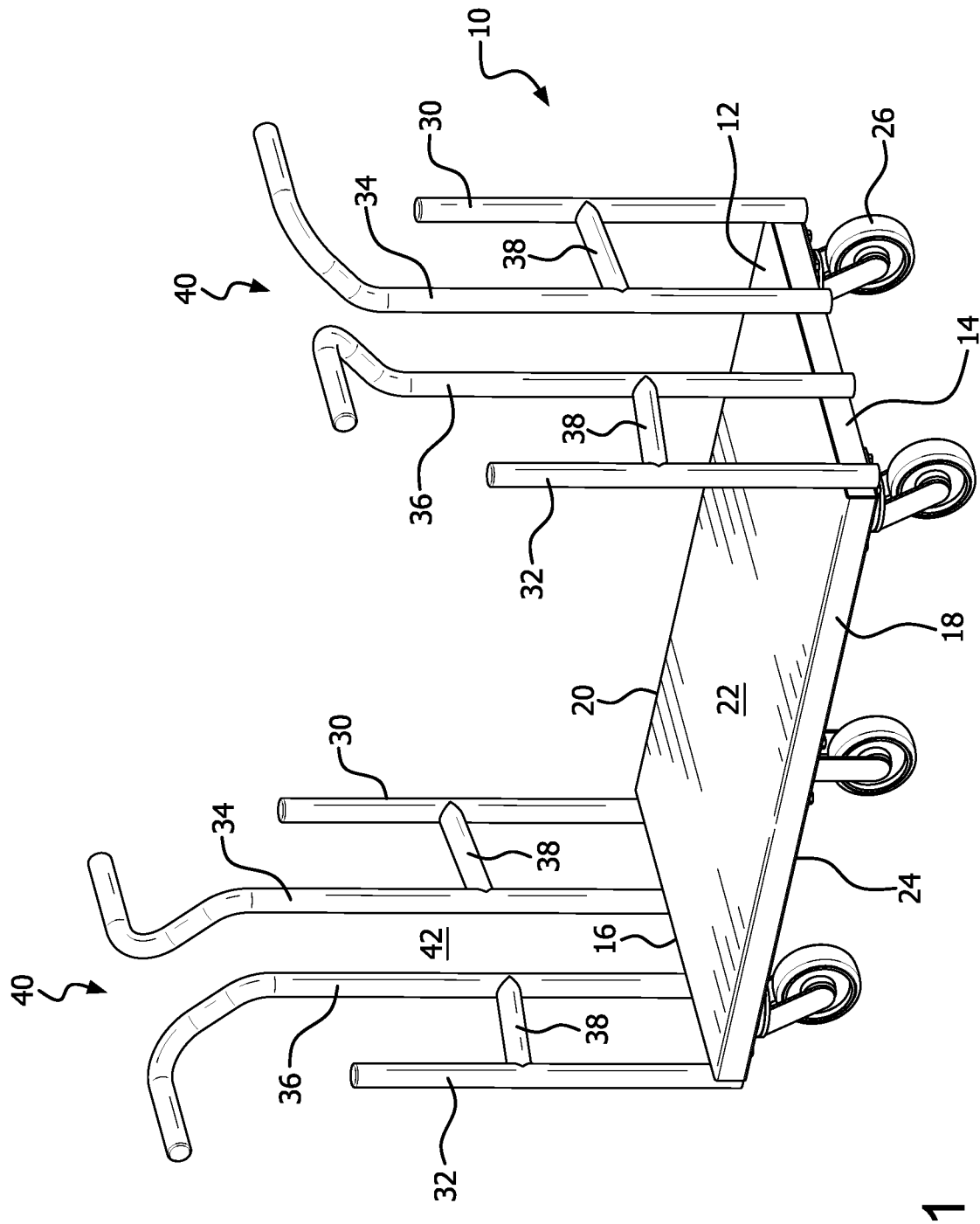
FIG. 1 is a top isometric view of a cart in accordance with the present invention
Figure 2:
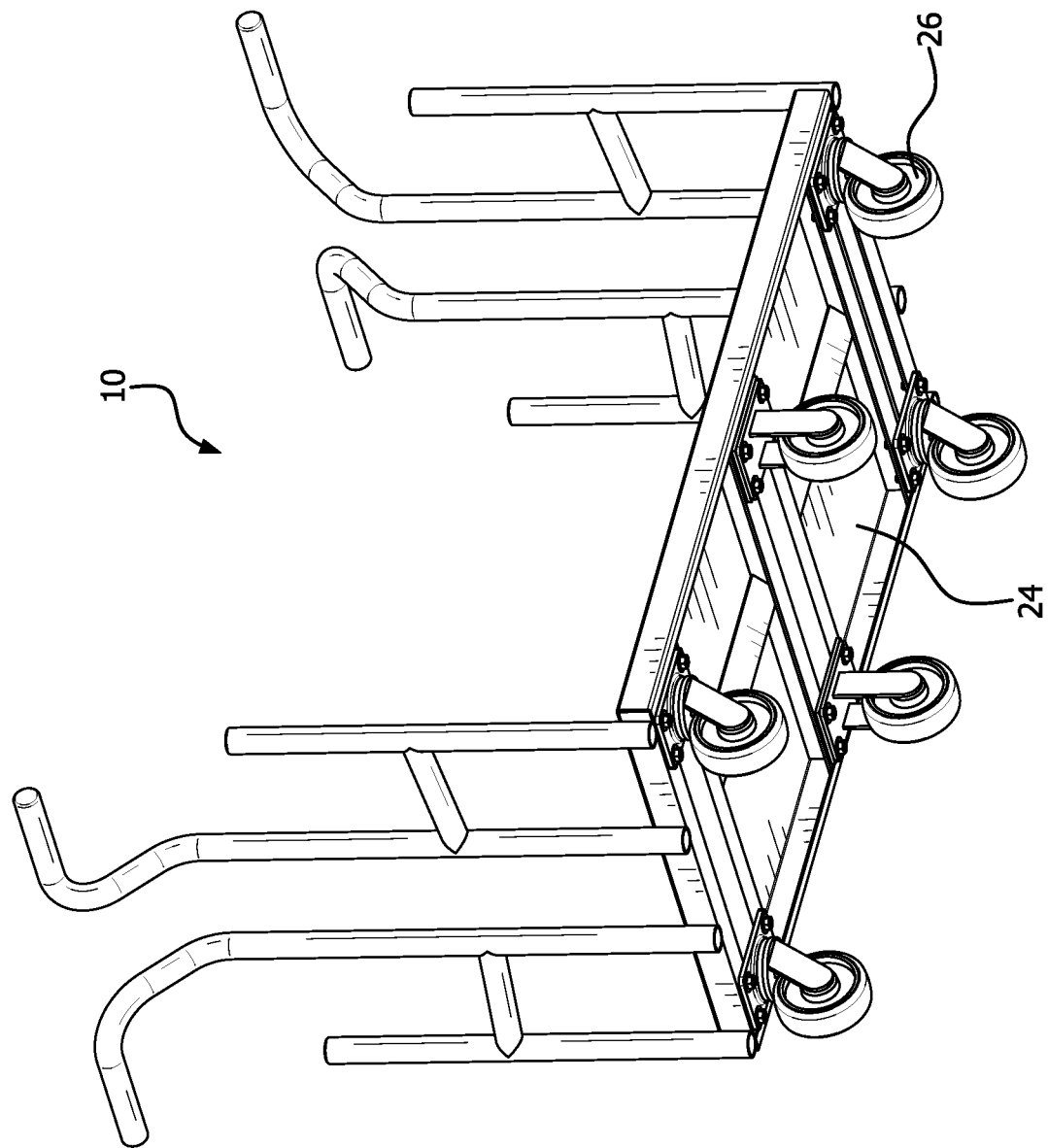
FIG. 2 is a bottom isometric views of a cart the cart described in accordance with FIG. 1.
Figure 3:
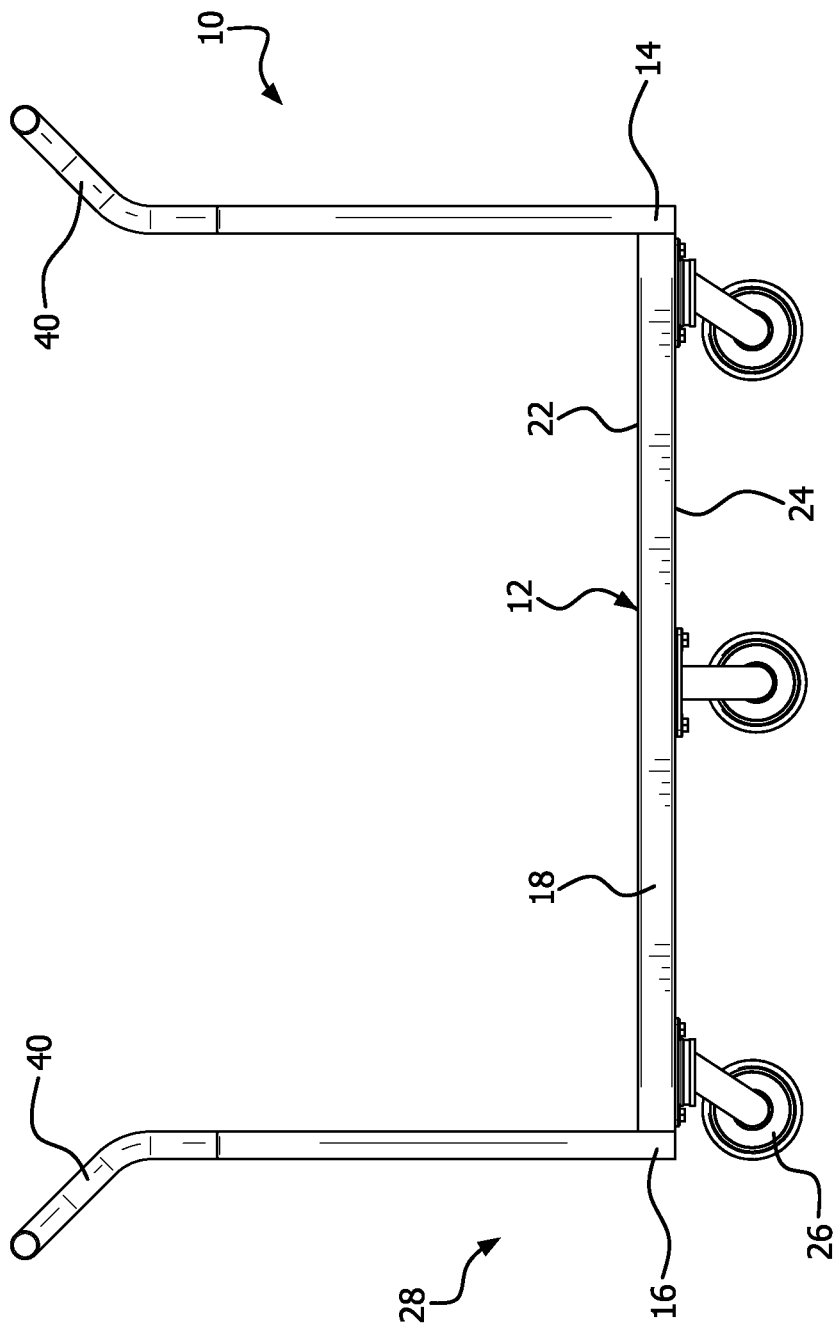
FIG. 3 is a side view of the cart described in accordance with FIG. 1.
Figure 4:
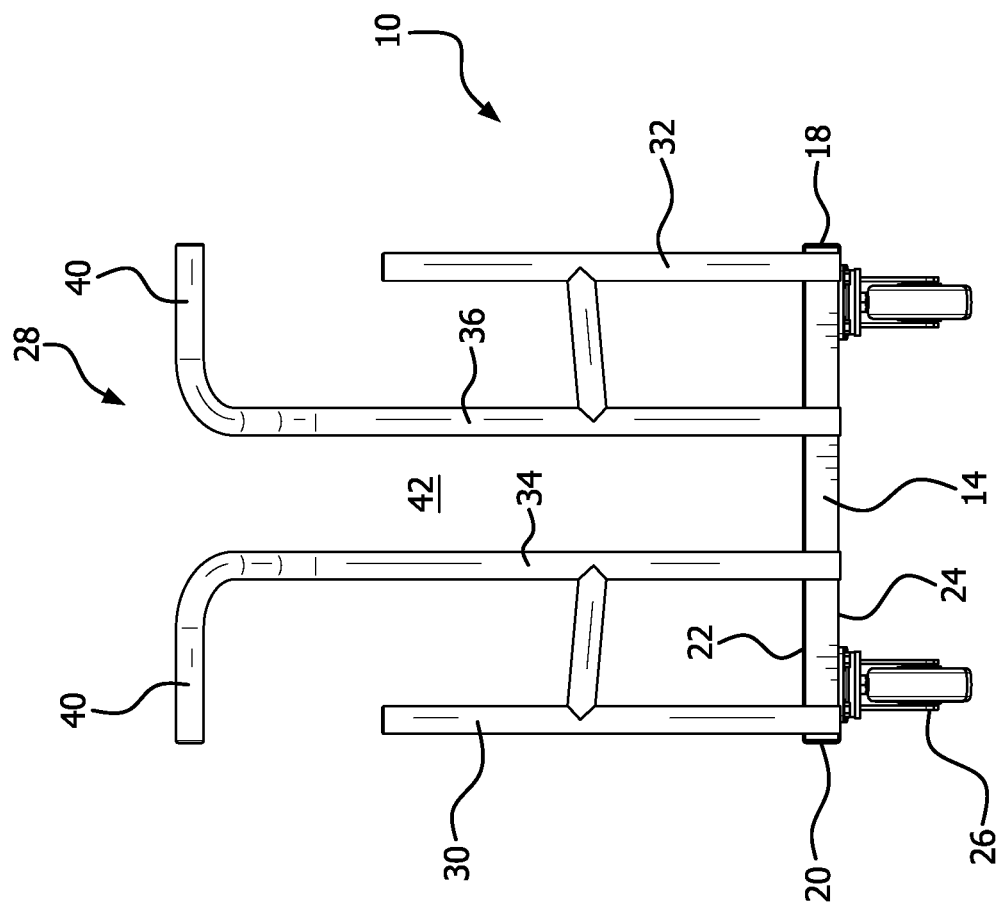
FIG. 4 is a front side view of the cart described in accordance with FIG. 1.
Figure 5:
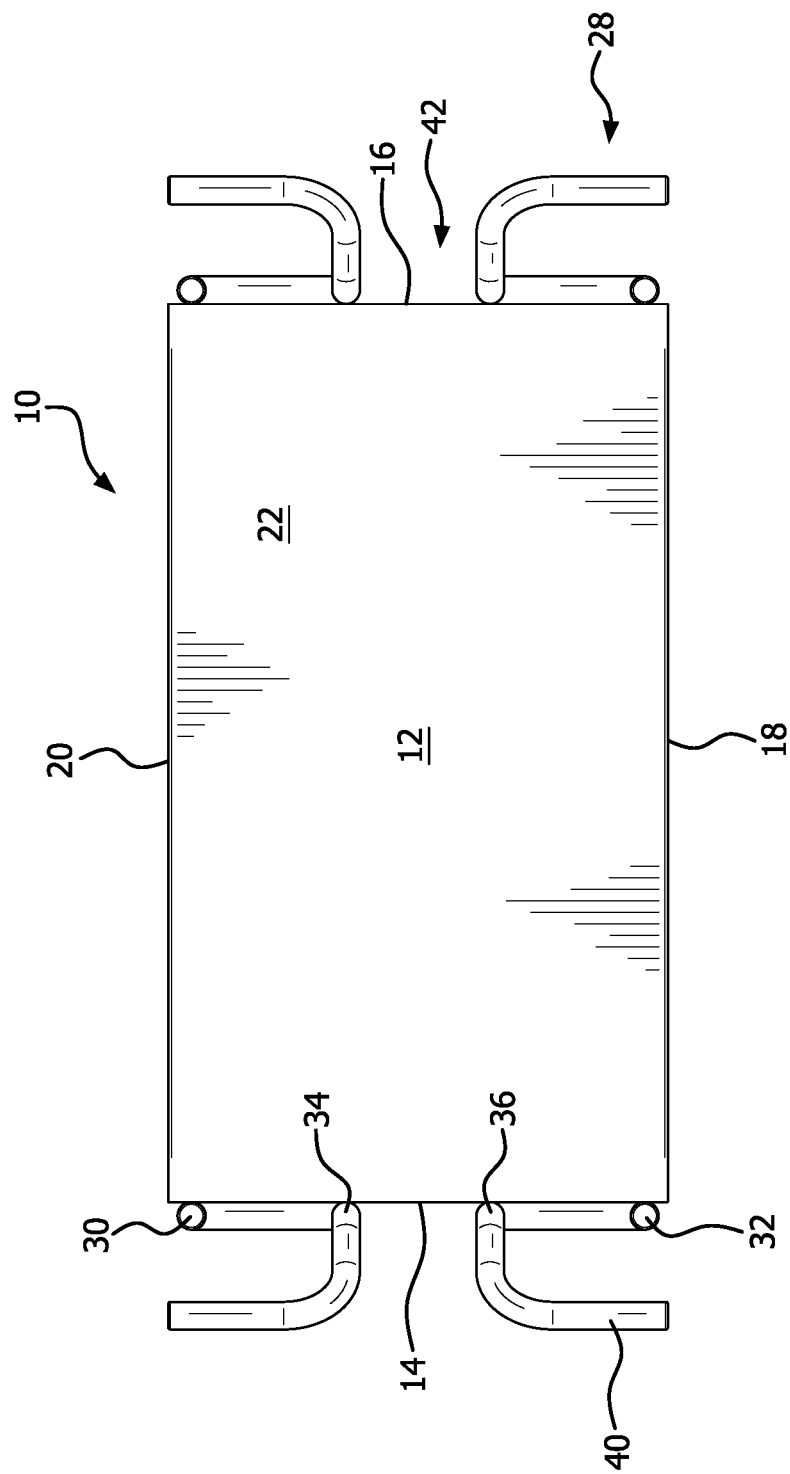
FIG. 5 is a top plan view of the cart described in accordance with FIG. 1.
Figure 6:
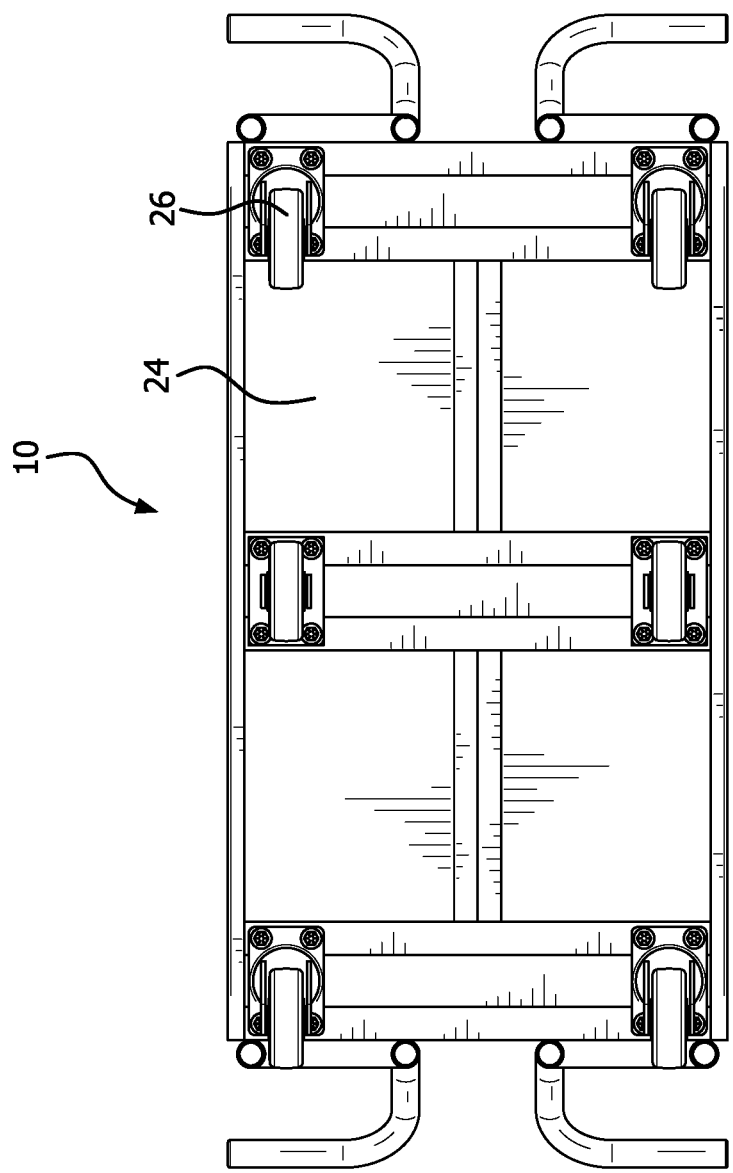
FIG. 6 is a bottom plan view of the cart described in accordance with FIG. 1.

Referring now to FIGS. 1-6, a cart 10 in accordance with the present invention is shown. The cart includes a generally flat planar platform 12 for carrying or holding bulk goods thereon. The platform 12 includes first and second oppositely disposed ends 14 and 16. The platform 12 also includes first and second oppositely disposed sides 18 and 20. The platform 12 also includes a top surface 22 and an underside 24.

One or more casters or wheels 26 are attached to the underside 24 of the platform 12 to facilitate mobility of the cart 10.

The cart 10 includes a plurality of upstanding rails 28 that extend from the platform 12 at one or both ends 14 and 16 of the cart. The rails include outer rails 30 and 32 located near the corners of the platform 12 and a pair of inner rails 34 and 36 disposed inwardly of the outer rails near the centerline of each end 14 and 16. A crossbar 38 is disposed between and connects one of the outer rails to one of the inner rails for stability and to provide a support surface for objects.

An outwardly curved handle 40 extends from the top of each inner rail 34 and 36 and facilitates the user's ability to push and/or pull the cart 10 to cause movement of the cart.

An opening 42 is formed between the inner rails 34 and 36 for accepting elongated goods which might extend past the ends 14 and 16 of the platform 12.

The cart 10 of the present invention can be pushed from both ends using the handles 40. The opening 42 creates a slot for plywood, OSB, and the like and other long products such as dimensional lumber, eliminating the need for the lumber cart. Intuitive customers will understand the function of the cart 10 with little effort. Boxes and other product may be stacked on the platform 12 similarly to the conventional flat cart or flat bed cart. The rails 28 prevent goods and stacked goods from sliding off the ends of the cart when the cart is stopped quickly or abruptly.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cart comprising:
   a planar platform for holding bulk goods, the platform comprising first and second oppositely disposed ends and first and second oppositely disposed sides, a top surface and an underside;
   one or more casters or wheels attached to the platform to facilitate mobility; and
   a plurality of upstanding rails extend from the platform at one or both oppositely disposed ends of the cart, the plurality of upstanding rails include outer rails located near corners of the platform and a pair of inner rails disposed inwardly of the outer rails near a centerline of each end; and
   a crossbar disposed between and connecting one of the outer rails to one of the inner rails for stability and to provide a support surface and an outwardly curved handle extends from a top of each inner rail, each outwardly curved handle comprises an intermediate portion that extends upwardly and longitudinally away from the cart and an end portion that extends laterally and horizontally from the intermediate portion which facilitates a user's ability to push and/or pull the cart.

2. A cart comprising:
   a planar platform for holding bulk goods, the platform comprising first and second oppositely disposed ends and first and second oppositely disposed sides, a top surface and an underside;
   one or more casters or wheels attached to the platform to facilitate mobility; and
   a plurality of upstanding rails extend from the platform at one or both oppositely disposed ends of the cart, the plurality of upstanding rails include outer rails located near corners of the platform and a pair of inner rails disposed inwardly of the outer rails near a centerline of each end; and a crossbar disposed between and connecting one of the outer rails to one of the inner rails for stability and to provide a support surface and an outwardly curved handle extends from a top of each inner rail, each of the outwardly curved handles further comprises a portion that extends longitudinally away from a center of the platform and an other portion that extends from the first portion along a lateral axis away from the center of the platform, wherein each crossbar is inclined downwardly from the outer rail to the inner rail.

3. A cart comprising:

a planar platform for holding bulk goods, the platform comprising first and second oppositely disposed ends and first and second oppositely sides, a top surface and an underside;

one or more casters or wheels attached to the platform to facilitate mobility; and a plurality of upstanding rails extend from the platform at one or both oppositely disposed ends of the cart, the plurality of upstanding rails include outer rails located near corners of the platform and a pair of inner rails disposed inwardly of the outer rails near a centerline of each end; and a crossbar disposed between and connecting one of the outer rails to one of the inner rails for stability and to provide a support surface and an outwardly curved handle extends from a top of each inner rail, each of the outwardly curved handles further comprises a portion that extends longitudinally away from a center of the platform and an other portion that extends from the first portion along a lateral axis away from the center of the platform, wherein an opening is formed between the inner rails for accepting elongated goods and each crossbar is inclined downwardly from the outer rail to the inner rail.

* * * * *